(12) United States Patent
Vallius et al.

(10) Patent No.: US 11,112,605 B2
(45) Date of Patent: Sep. 7, 2021

(54) DIFFRACTIVE OPTICAL ELEMENTS WITH ASYMMETRIC PROFILES

(71) Applicant: Microsoft Technology Licensing, LLC, Redmond, WA (US)

(72) Inventors: Tuomas Vallius, Espoo (FI); Lauri Sainiemi, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/854,948

(22) Filed: Apr. 22, 2020

(65) Prior Publication Data

US 2020/0292814 A1 Sep. 17, 2020

Related U.S. Application Data

(63) Continuation of application No. 14/790,379, filed on Jul. 2, 2015, now Pat. No. 10,670,862.

(51) Int. Cl.
*G02B 27/01* (2006.01)
*G02B 27/00* (2006.01)
(Continued)

(52) U.S. Cl.
CPC ....... *G02B 27/0101* (2013.01); *G02B 5/1819* (2013.01); *G02B 5/1852* (2013.01);
(Continued)

(58) Field of Classification Search
CPC .... G02B 27/0172; G02B 5/18; G02B 5/1842; G02B 27/4205; G02B 27/0081;
(Continued)

(56) References Cited

U.S. PATENT DOCUMENTS

2010/0277803 A1* 11/2010 Pockett .............. G02B 27/0081
359/567
2010/0321781 A1* 12/2010 Levola ............... G02B 27/4205
359/569
(Continued)

OTHER PUBLICATIONS

"Second Office Action Issued in Chinese Patent Application No. 201680039259.4", dated Apr. 2, 2020, 6 Pages.
(Continued)

*Primary Examiner* — William R Alexander
*Assistant Examiner* — Sharrief I Broome
(74) *Attorney, Agent, or Firm* — Mark K. Young; Mayer & Williams, PC

(57) ABSTRACT

In an optical display system that includes a waveguide with multiple diffractive optical elements (DOEs), gratings in one or more of the DOEs may have an asymmetric profile in which gratings may be slanted or blazed. Asymmetric gratings in a DOE can provide increased display uniformity in the optical display system by reducing the "banding" resulting from optical interference that is manifested as dark stripes in the display. Banding may be more pronounced when polymeric materials are used in volume production of the DOEs to minimize system weight, but which have less optimal optical properties compared with other materials such as glass. The asymmetric gratings can further enable the optical system to be more tolerant to variations—such as variations in thickness, surface roughness, and grating geometry—that may not be readily controlled during manufacturing particularly since such variations are in the submicron range.

20 Claims, 11 Drawing Sheets

(51) Int. Cl.
*G02B 27/42* (2006.01)
*G02B 5/18* (2006.01)

(52) U.S. Cl.
CPC ..... *G02B 27/0081* (2013.01); *G02B 27/4205* (2013.01); *G02B 27/4272* (2013.01); *G02B 27/0172* (2013.01); *G02B 2027/0112* (2013.01); *G02B 2027/0178* (2013.01)

(58) Field of Classification Search
CPC .......... G02B 5/1861; G02B 2027/0178; G02B 27/0101; G02B 6/00; G02B 2027/0125; G02B 2027/0118; G02B 2027/0174; G02B 27/0103; G02B 5/32; G02B 2027/0123; G02B 27/017; G02B 5/1814; G02B 6/34; G02B 27/4272; G02B 6/0038; B42D 25/328; B42D 25/29; B42D 25/324; B42D 25/00; B42D 2035/24; B42D 2033/20; B42D 2033/10; B42D 2033/18; B42D 25/373; B42D 25/425; B42D 25/45; B42D 2033/04; B42D 2033/16; B42D 2033/24; B42D 2035/20; B42D 2035/50; B42D 25/351; B42D 25/369; B42D 25/47; B42D 2033/26; G03H 1/0244; G03H 1/0011; G03H 1/26; G03H 2270/24; G03H 1/265; G03H 2001/0284; G03H 2001/0478; G03H 2001/0497; G03H 2001/188; G03H 1/0256; G03H 1/028; G03H 1/268; G03H 1/28; G03H 2001/0016; G03H 2001/0288; G03H 2001/0296; G03H 2210/53; G03H 2210/55; G03H 2240/52; G03H 2250/10; G02F 1/133504; G02F 1/13342; G02F 1/292; G02F 1/133562; G02F 2201/305; G02F 1/0105; G02F 1/0131; G02F 1/13306; G02F 1/1334; G02F 1/133553; G02F 1/133555; G02F 1/133567; G02F 1/133615; G02F 1/13363; G02F 1/133631; G02F 1/1347; G02F 1/17; G02F 1/29; G02F 1/294; G02F 1/31

See application file for complete search history.

(56) References Cited

U.S. PATENT DOCUMENTS

| | | | |
|---|---|---|---|
| 2013/0051730 A1* | 2/2013 | Travers | G02B 27/4272 385/37 |
| 2013/0242392 A1* | 9/2013 | Amirparviz | G02B 5/3058 359/485.05 |
| 2014/0217385 A1* | 8/2014 | Gaertner | H01L 51/5268 257/40 |
| 2014/0300695 A1* | 10/2014 | Smalley | G03H 1/02 348/40 |

OTHER PUBLICATIONS

"Third Office Action Issued in Chinese Patent Application No. 201680039304.6", dated Jul. 9, 2020, 9 Pages.

* cited by examiner

DIFFRACTIVE OPTICAL ELEMENTS WITH ASYMMETRIC PROFILES

CROSS REFERENCE TO RELATED APPLICATION

This application is a continuation of U.S. Ser. No. 14/790,379, filed Jul. 2, 2015, entitled, "DIFFRACTIVE OPTICAL ELEMENTS WITH ASYMMETRIC PROFILES", the contents of which are hereby incorporated by reference in its entirety.

BACKGROUND

Diffractive optical elements (DOEs) are optical elements with a periodic structure that are commonly utilized in applications ranging from bio-technology, material processing, sensing, and testing to technical optics and optical metrology. By incorporating DOEs in an optical field of a laser or emissive display, for example, the light's "shape" can be controlled and changed flexibly according to application needs.

SUMMARY

In an optical display system that includes a waveguide with multiple diffractive optical elements (DOEs), gratings in one or more of the DOEs may have an asymmetric profile in which gratings are slanted (i.e., walls of the grating are non-orthogonal to the plane of the waveguide) or blazed. Asymmetric gratings in a DOE can provide increased display uniformity in the optical display system by reducing the "banding" resulting from optical interference that is manifested as dark stripes in the display. Banding may be more pronounced when polymeric materials are used in volume production of the DOEs to minimize system weight, but which have less optimal optical properties compared with other materials such as glass. Asymmetric gratings can further enable the optical system to be more tolerant to variations—such as variations in thickness, surface roughness, and grating geometry—that may not be readily controlled during manufacturing, particularly since such variations are in the submicron range.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

Like reference numerals indicate like elements in the drawings. Elements are not drawn to scale unless otherwise indicated.

DETAILED DESCRIPTION

Figure 1:
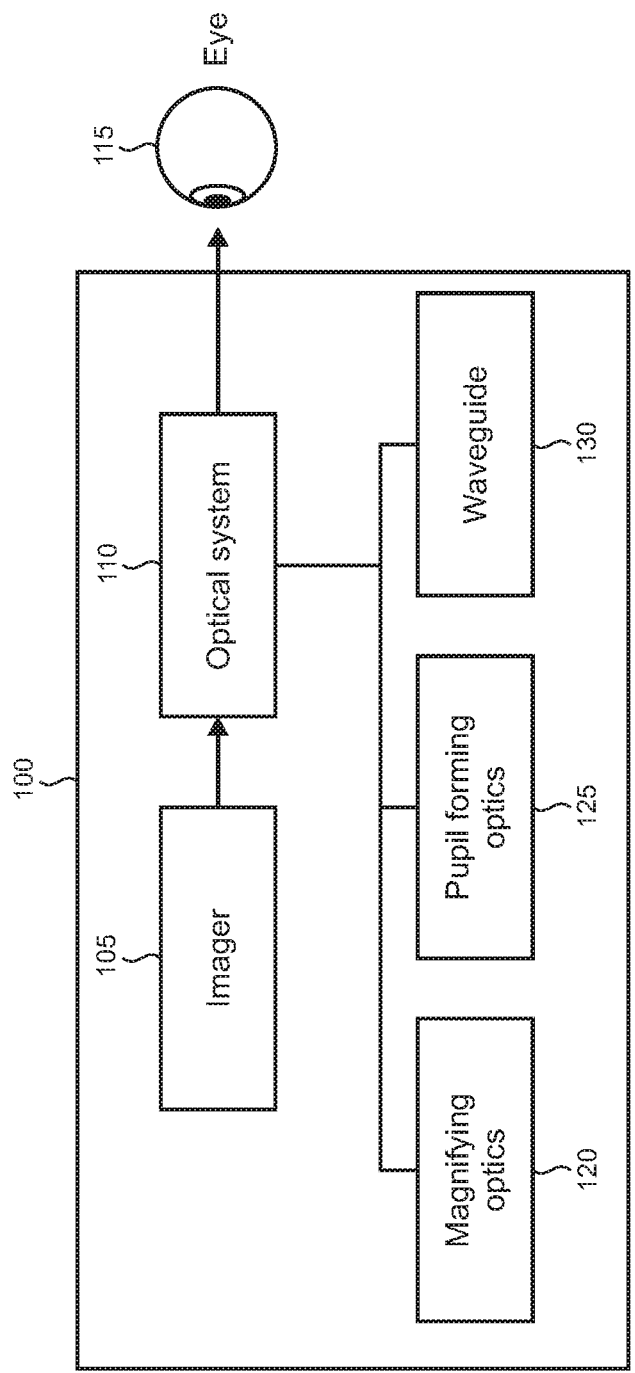
FIG. 1 shows a block diagram of an illustrative near eye display system which may incorporate the diffractive optical elements (DOEs) with asymmetric features.

FIG. 1 shows a block diagram of an illustrative near eye display system 100 which may incorporate diffractive optical elements (DOEs) with asymmetric profiles. Near eye display systems are frequently used, for example, in head mounted display (HMD) devices in industrial, commercial, and consumer applications. Other devices and systems may also use DOEs with asymmetric profiles, as described below, and it is emphasized that the near eye display system 100 is intended to be an example that is used to illustrate various features and aspects, and the present DOEs are not necessarily limited to near eye display systems.

System 100 may include an imager 105 that works with an optical system 110 to deliver images as a virtual display to a user's eye 115. The imager 105 may include, for example, RGB (red, green, blue) light emitting diodes (LEDs), LCOS (liquid crystal on silicon) devices, OLED (organic light emitting diode) arrays, MEMS (micro-electro mechanical system) devices, or any other suitable displays or micro-displays operating in transmission, reflection, or emission. The imager 105 may also include mirrors and other components that enable a virtual display to be composed and provide one or more input optical beams to the optical system. The optical system 110 can typically include magnifying optics 120, pupil forming optics 125, and one or more waveguides 130.

In a near eye display system the imager does not actually shine the images on a surface such as glass lenses to create the visual display for the user. This is not feasible because the human eye cannot focus on something that is that close. Indeed, rather than create a visible image on a surface, the near eye optical system 100 uses the pupil forming optics 125 to form a pupil and the eye 115 acts as the last element in the optical chain and converts the light from the pupil into an image on the eye's retina as a virtual display.

Figure 2:
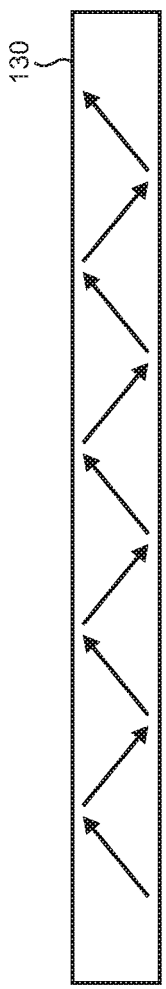
FIG. 2 shows propagation of light in a waveguide by total internal reflection.

The waveguide 130 facilitates light transmission between the imager and the eye. One or more waveguides can be utilized in the near eye display system because they are transparent and because they are generally small and lightweight (which is desirable in applications such as HMD devices where size and weight is generally sought to be minimized for reasons of performance and user comfort). For example, the waveguide 130 can enable the imager 105 to be located out of the way, for example, on the side of the head, leaving only a relatively small, light, and transparent waveguide optical element in front of the eyes. In one implementation, the waveguide 130 operates using a principle of total internal reflection, as shown in FIG. 2, so that light can be coupled among the various optical elements in the system 100.

Figure 3:
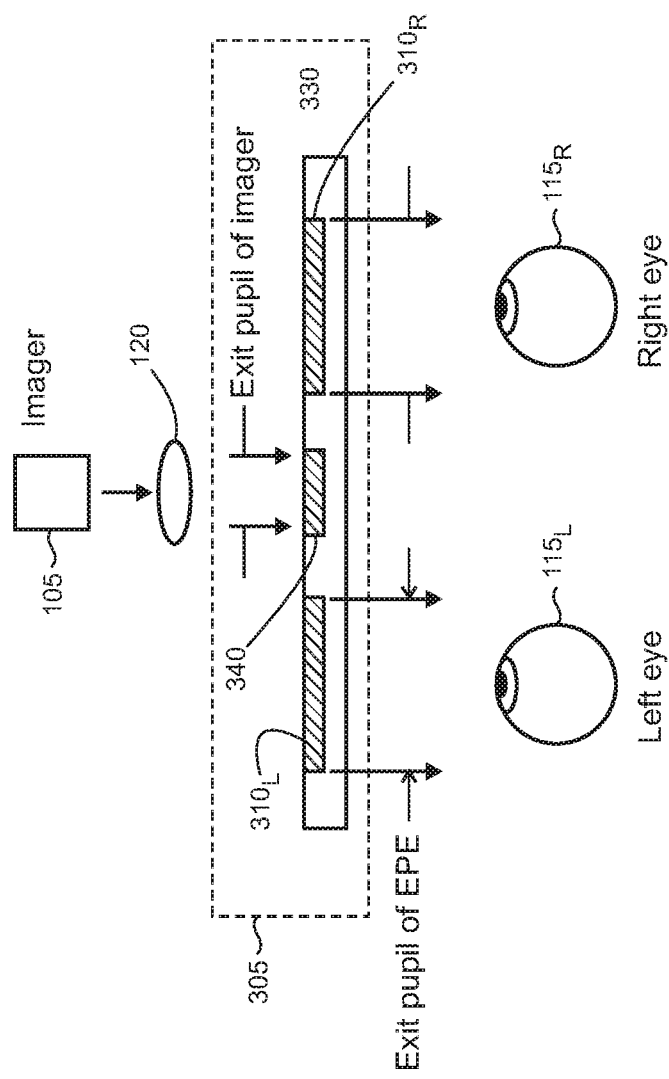
FIG. 3 shows a view of an illustrative exit pupil expander.

FIG. 3 shows a view of an illustrative exit pupil expander (EPE) 305. EPE 305 receives an input optical beam from the imager 105 through magnifying optics 120 to produce one or more output optical beams with expanded exit pupil in one or two dimensions relative to the exit pupil of the imager (in general, the input may include more than one optical beam which may be produced by separate sources). The expanded exit pupil typically facilitates a virtual display to be sufficiently sized to meet the various design requirements of a given optical system, such as image resolution, field of view, and the like, while enabling the imager and associated components to be relatively light and compact.

The EPE 305 is configured, in this illustrative example, to support binocular operation for both the left and right eyes (components which may be utilized for stereoscopic operation such as scanning mirrors, lenses, filters, beam splitters, MEMS devices, or the like are not shown in FIG. 3 for sake of clarity in exposition). Accordingly, the EPE 305 utilizes two out-coupling gratings, $310_L$ and $310_R$ that are supported on a waveguide 330 and a central in-coupling grating 340. The in-coupling and out-coupling gratings may be configured using multiple DOEs, as described in the illustrative example below. While the EPE 305 is depicted as having a planar configuration, other shapes may also be utilized including, for example, curved or partially spherical shapes, in which case the gratings disposed thereon are non-coplanar.

Figure 4:
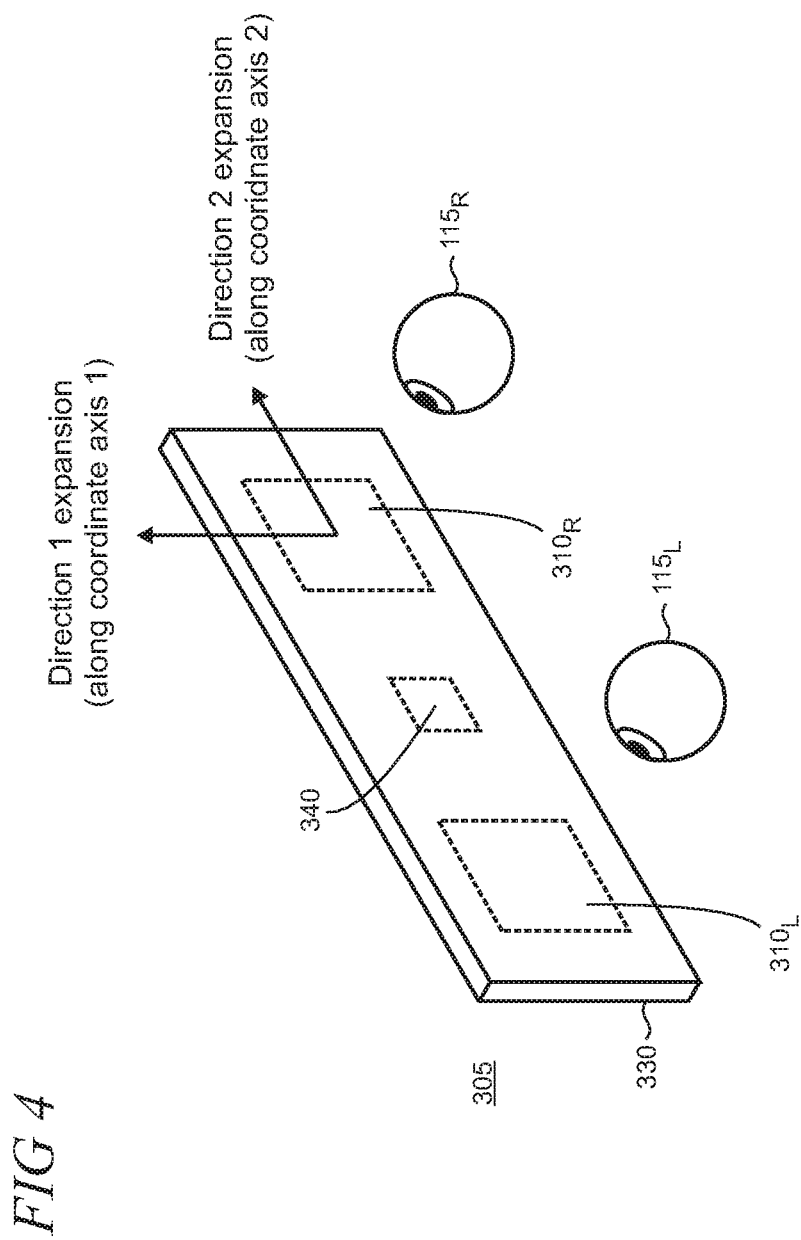
FIG. 4 shows a view of the illustrative exit pupil expander in which the exit pupil is expanded along two directions.

As shown in FIG. 4, the EPE 305 may be configured to provide an expanded exit pupil in two directions (i.e., along each of a first and second coordinate axis). As shown, the exit pupil is expanded in both the vertical and horizontal directions. It may be understood that the terms "direction," "horizontal," and "vertical" are used primarily to establish relative orientations in the illustrative examples shown and described herein for ease of description. These terms may be intuitive for a usage scenario in which the user of the near eye display device is upright and forward facing, but less intuitive for other usage scenarios. Accordingly, the listed terms are not to be construed to limit the scope of the configurations (and usage scenarios therein) of DOEs with asymmetric grating features.

Figure 5:
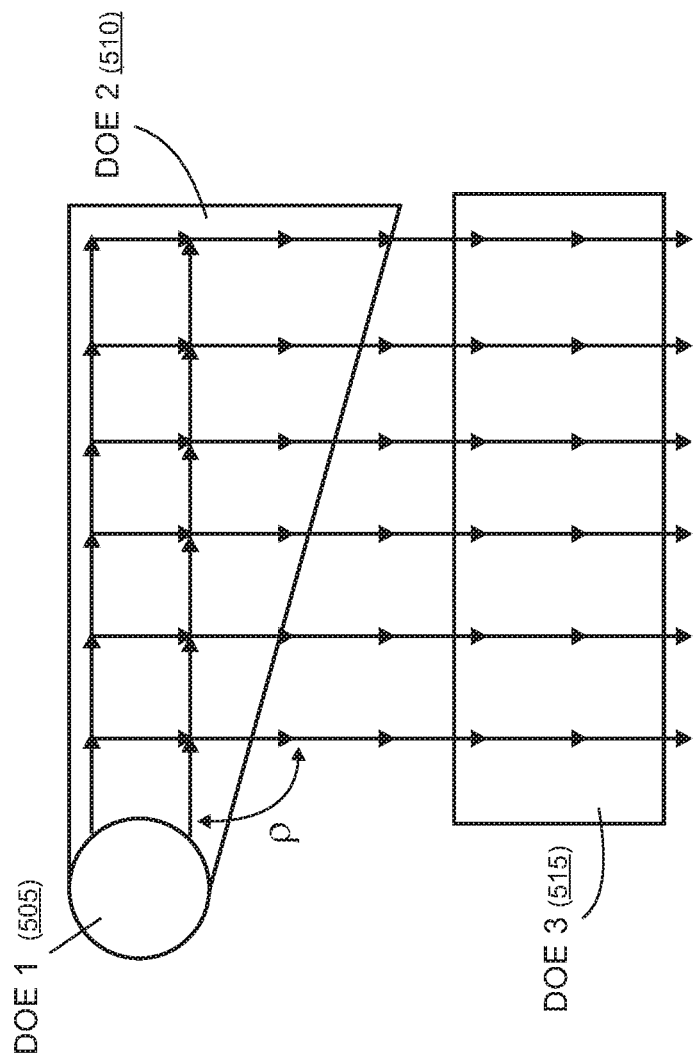
FIG. 5 shows an illustrative arrangement of three DOEs.

FIG. 5 shows an illustrative arrangement of three DOEs that may be used as part of a waveguide to provide in-coupling and expansion of the exit pupil in two directions. Each DOE is an optical element comprising a periodic structure that can modulate various properties of light in a periodic pattern such as the direction of optical axis, optical path length, and the like. The first DOE, DOE 1 (indicated by reference numeral 505), is configured to couple the beam from the imager into the waveguide. The second DOE, DOE 2 (510), expands the exit pupil in a first direction along a first coordinate axis, and the third DOE, DOE 3 (515), expands the exit pupil in a second direction along a second coordinate axis and couples light out of the waveguide. The angle ρ is a rotation angle between the periodic lines of DOE 2 and DOE 3 as shown. DOE 1 thus functions as an in-coupling grating and DOE 3 functions as an out-coupling grating while expanding the pupil in one direction. DOE 2 may be viewed as an intermediate grating that functions to couple light between the in-coupling and out-coupling gratings while performing exit pupil expansion in the other direction. Using such intermediate grating may eliminate a need for conventional functionalities for exit pupil expansion in an EPE such as collimating lenses.

Some near eye display system applications, such as those using HMD devices for example, can benefit by minimization of weight and bulk. As a result, the DOEs and waveguides used in an EPE may be fabricated using lightweight polymers. Such polymeric components can support design goals for size, weight, and cost, and generally facilitate manufacturability, particularly in volume production settings. However, polymeric optical elements generally have lower optical resolution relative to heavier high quality glass. Such reduced optical resolution and the waveguide's configuration to be relatively thin for weight savings and packaging constraints within a device can result in optical interference which appears as a phenomena referred to as "banding" in the display. The optical interference that results in banding arises from light propagating within the EPE that has several paths to the same location, in which the optical path lengths differ.

The banding is generally visible in the form of dark stripes which decrease optical uniformity of the display. Their location on the display may depend on small nanometer-scale variations in the optical elements including the DOEs in one or more of thickness, surface roughness, or grating geometry including grating line width, angle, fill factor, or the like. Such variation can be difficult to characterize and manage using tools that are generally available in manufacturing environments, and particularly for volume production. Conventional solutions to reduce banding include using thicker waveguides which can add weight and complicate package design for devices and systems. Other solutions use pupil expansion in the EPE in just one direction which can result in a narrow viewing angle and heightened sensitivity to natural eye variations among users.

Figure 6:
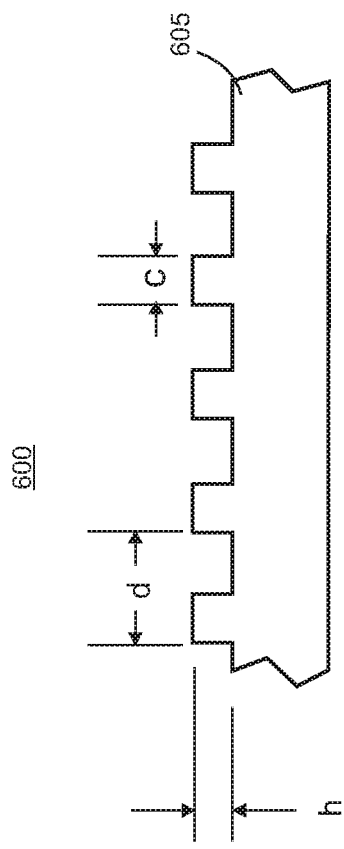
FIG. 6 shows a profile of a portion of an illustrative diffraction grating that has straight gratings.
Figure 7:
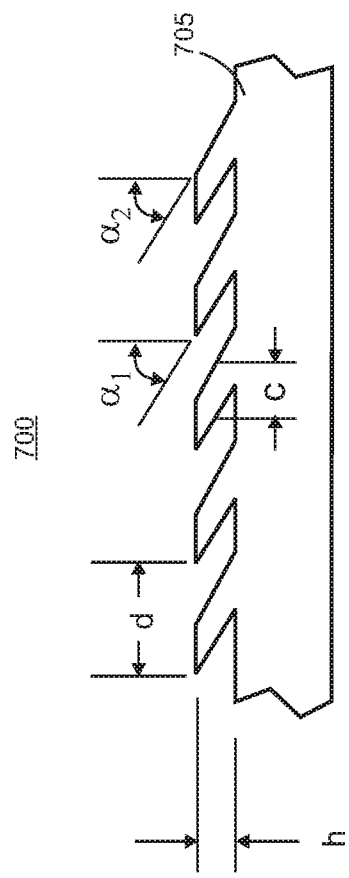
FIG. 7 shows an asymmetric profile of a portion of an illustrative diffraction grating that has slanted gratings.

By comparison, when one or more of the DOEs 505, 510, and 515 (FIG. 5) are configured with gratings that have an asymmetric profile, banding can be reduced even when the DOEs are fabricated from polymers and the waveguide 130 (FIG. 1) is relatively thin. FIG. 6 shows a profile of straight (i.e., non-slanted) grating features 600 (referred to as grating bars, grating lines, or simply "gratings"), that are formed in a substrate 605. By comparison, FIG. 7 shows grating features 700 formed in a substrate 705 that have an asymmetric profile. That is, the gratings may be slanted (i.e., non-orthogonal) relative to a plane of the waveguide. In implementations where the waveguide is non-planar, then the gratings may be slanted relative to a direction of light propagation in the waveguide. Asymmetric grating profiles can also be implemented using blazed gratings, or echelette gratings, in which grooves are formed to create grating features with asymmetric triangular or sawtooth profiles.

In FIGS. 6 and 7, the grating period is represented by d, the grating height by h, bar width by c, and the filling factor by f, where f=c/d. The slanted gratings in FIG. 7 may be described by slant angles $\alpha_1$ and $\alpha_2$. In one exemplary embodiment, for a DOE, d=390 nm, c=d/2, h=300 nm, $\alpha_1=\alpha_2=45$ degrees, f=0.5, and the refractive index of the substrate material is approximately 1.71. In other implementations, ranges of suitable values may include d=250 nm–450 nm, h=200 nm–400 nm, f=0.3–0.0, and $\alpha_1$=30–50 degrees, with refractive indices of 1.7 to 1.9. In another exemplary embodiment, DOE 2 is configured with portions that have asymmetric profiles, while DOE 1 and DOE 3 are configured with conventional symmetric profiles using straight gratings.

By slanting the gratings in one or more of the DOEs 505, 510, and 515, banding can be reduced to increase optical uniformity while enabling manufacturing tolerances for the DOEs to be less strict, as compared with using the straight grating features shown in FIG. 6 for the same level of uniformity. That is, the slanted gratings shown in FIG. 7 are more tolerant to manufacturing variations noted above than the straight gratings shown in FIG. 6, for comparable levels of optical performance (e.g., optical resolution and optical uniformity).

Figure 9:
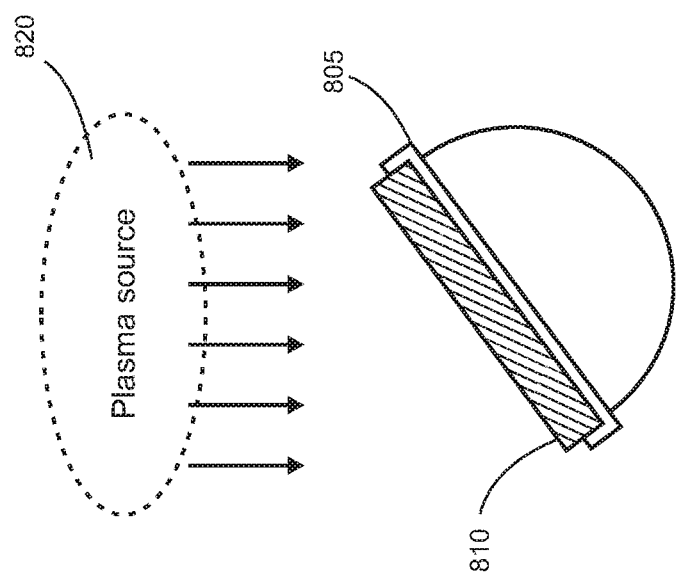
FIGS. 8 and 9 show an illustrative arrangement for DOE fabrication.
Figure 8:
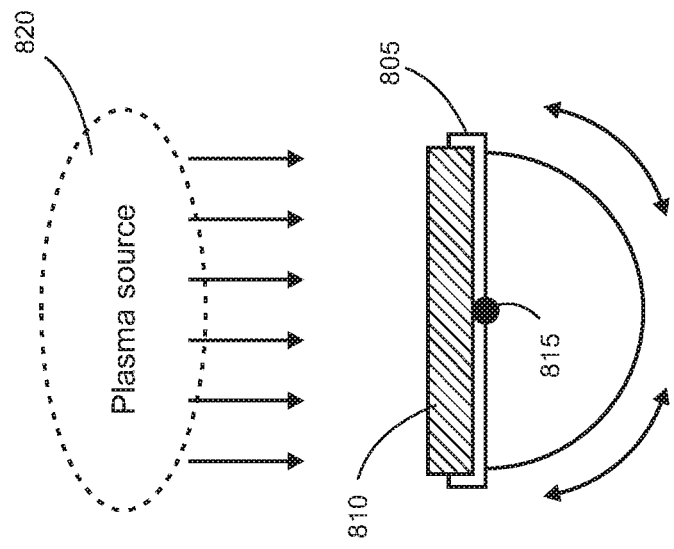

FIGS. 8 and 9 show an illustrative arrangement for DOE fabrication using a substrate holder 805 that rotates a grating substrate 810 about an axis 815 relative to a reactive ion etching plasma source 820. Exposure to the plasma may be used, for example, to adjust the thickness and orientation of the etching on the grating substrate at various positions by angling the substrate relative to the source as shown in FIG. 9 using, for example, a computer-controller or other suitable control system (not shown). In an illustrative example, the etching may be performed using a reactive ion beam etching (RIBE). However, other variations of ion beam etching may be utilized in various implementations including, for example, magnetron reactive ion etching (MRIE), high density plasma etching (HDP), transformer coupled plasma etching (TCP), inductively coupled plasma etching (ICP), and electron cyclotron resonance plasma etching (ECR).

By controlling the exposure of the substrate to the plasma, grating angle and depth can be controlled to create a slanted microstructure on the substrate. The microstructure may be replicated for mass production in a lightweight polymer material using one of cast-and-cure, embossing, compression molding, or compression injection molding, for example.

Figure 11:
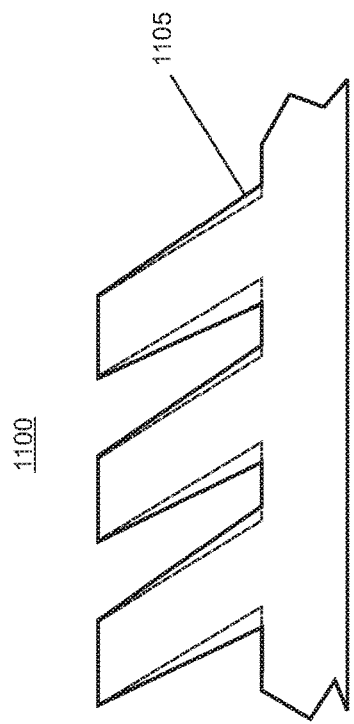
FIGS. 10-12 show various illustrative asymmetric profiles for slanted gratings.
Figure 10:
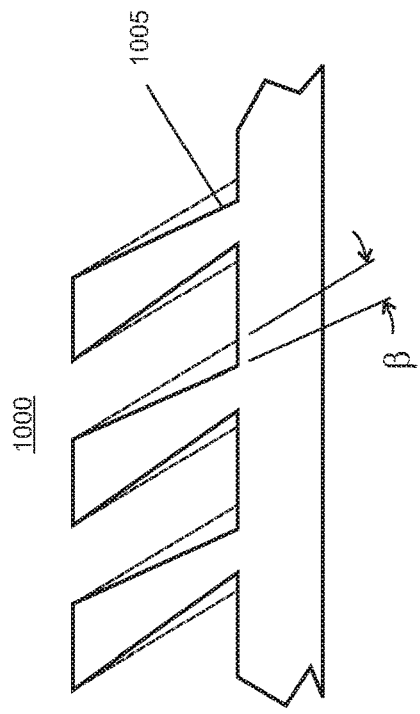
Figure 12:
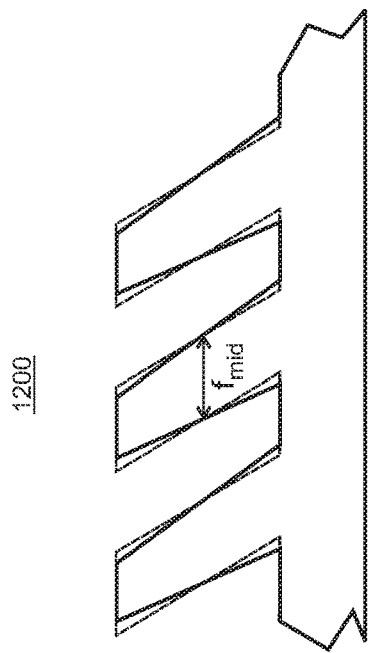

Ion beam etching may produce variations from the idealized grating shown in FIG. 6 in which the gratings have parallel walls. The profile 1000 in FIG. 10 includes non-parallel sidewalls (representatively indicated by reference numeral 1005) that are undercut and the profile 1100 in FIG. 11 includes non-parallel sidewalls 1105 that are overcut. The change in angle of the sidewalls is denoted by β, as shown in FIG. 10, and a positive value of β implies undercutting while a negative value of β implies overcutting. Compensation for the effects of undercutting and overcutting can be realized in some implementations by ensuring that a fill factor $f_{mid}$ in the center of the feature meets the design value for the grating, as shown in profile 1200 in FIG. 12. Here, the grating walls essentially pivot about this center position as β varies.

Figure 13:
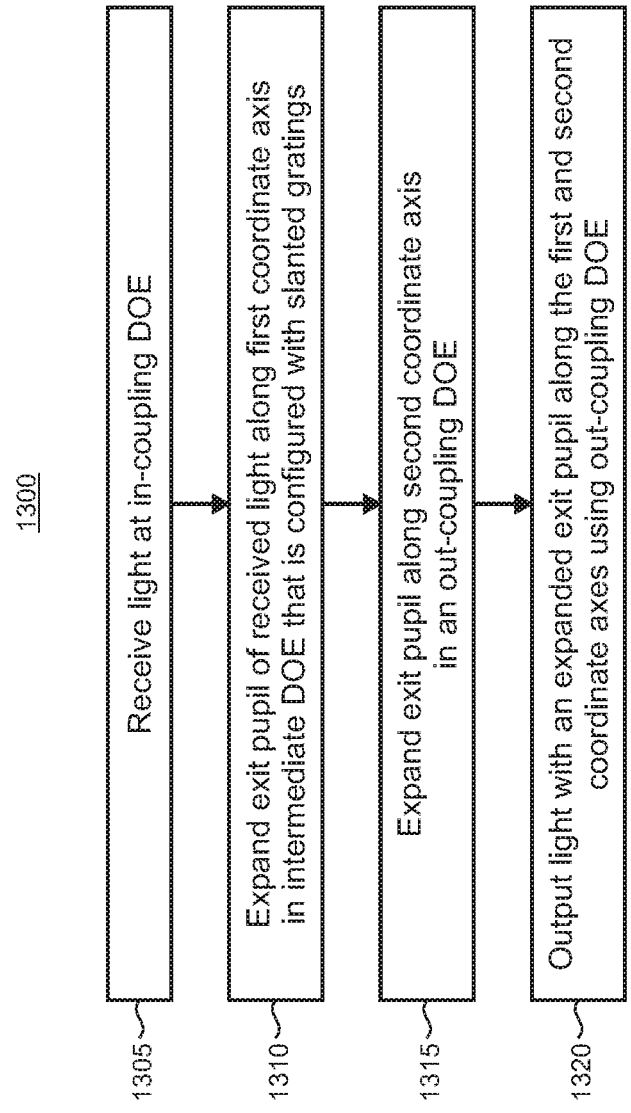
FIG. 13 shows an illustrative method.

FIG. 13 is a flowchart 13 of an illustrative method 1300. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1305, light is received at an in-coupling DOE. The in-coupling grating is disposed in an EPE and interfaces with the downstream intermediate DOE that is disposed in the EPE. In step 1310, the exit pupil of the received light is expanded along a first coordinate axis in the intermediate DOE. The intermediate DOE is configured with gratings having an asymmetric profile such as slanted gratings or blazed gratings. In step 1315, the exit pupil is expanded in an out-coupling DOE which outputs light with an expanded exit pupil relative to the received light at the in-coupling DOE along the first and second coordinate axes in step 1320. The intermediate DOE is configured to interface with a downstream out-coupling DOE. In some implementations, the out-coupling DOE may be apodized with shallow gratings that are configured to be either straight or slanted.

DOEs with asymmetric profiles may be incorporated into a display system that is utilized in a virtual or mixed reality display device. Such device may take any suitable form, including but not limited to near-eye devices such as an HMD device. A see-through display may be used in some implementations while an opaque (i.e., non-see-through) display using a camera-based pass-through or outward facing sensor, for example, may be used in other implementations.

Figure 14:
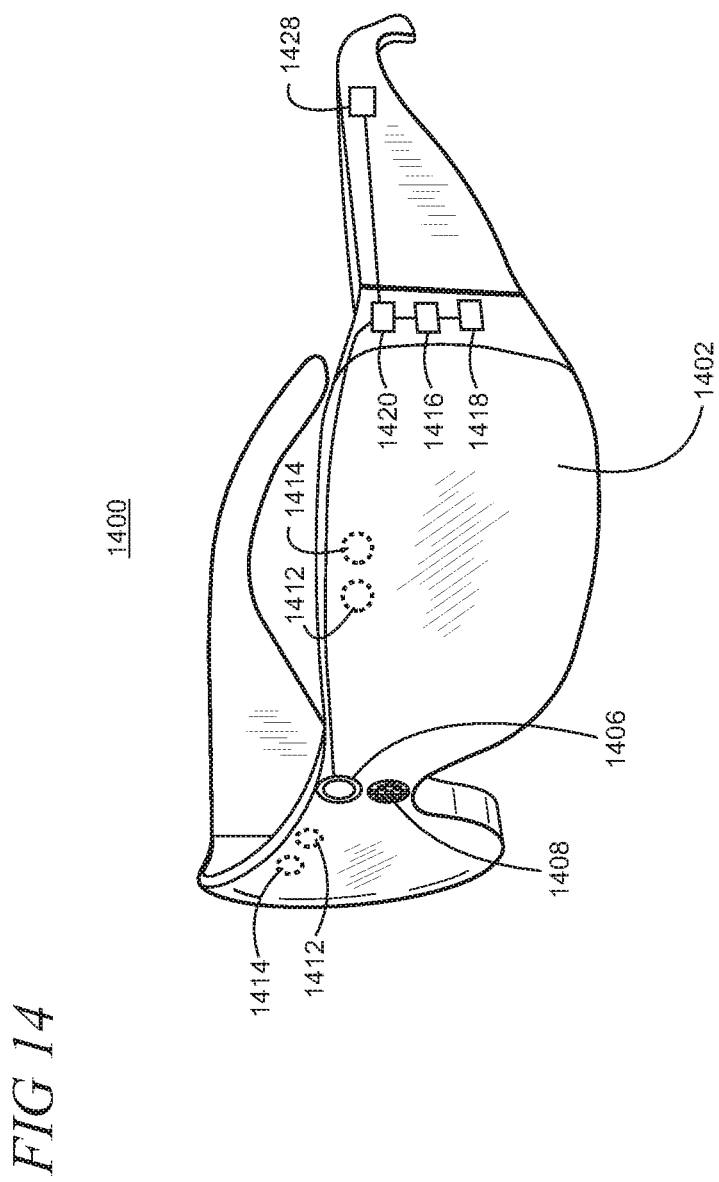
FIG. 14 is a pictorial view of an illustrative example of a virtual reality or mixed reality head mounted display (HMD) device.
Figure 15:
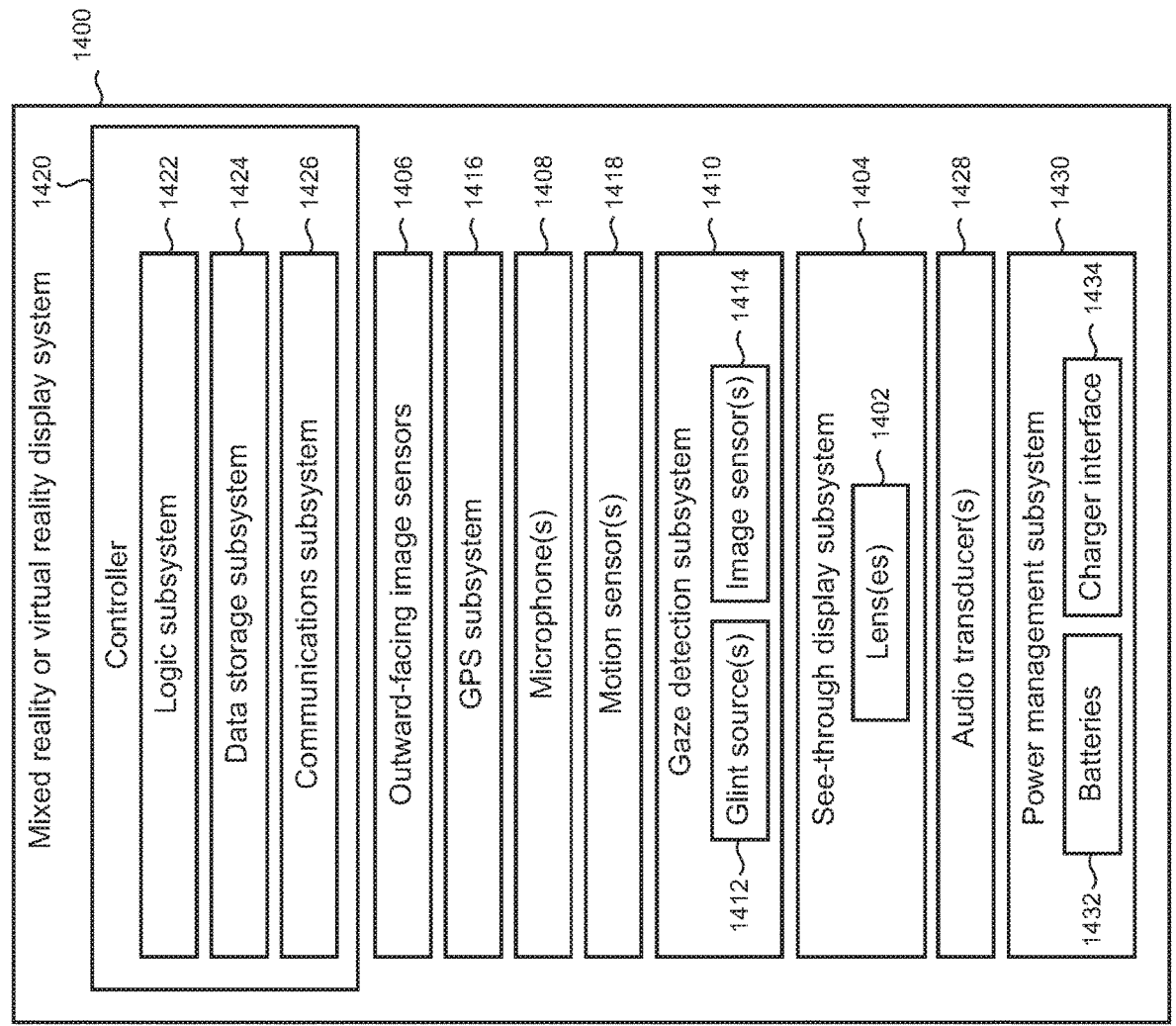
FIG. 15 shows a block diagram of an illustrative example of a virtual reality or mixed reality HMD device.

FIG. 14 shows one particular illustrative example of a see-through, mixed reality or virtual reality display system 1400, and FIG. 15 shows a functional block diagram of the system 1400. Display system 1400 comprises one or more lenses 1402 that form a part of a see-through display subsystem 1404, such that images may be displayed using lenses 1402 (e.g. using projection onto lenses 1402, one or more waveguide systems incorporated into the lenses 1402, and/or in any other suitable manner). Display system 1400 further comprises one or more outward-facing image sensors 1406 configured to acquire images of a background scene and/or physical environment being viewed by a user, and may include one or more microphones 1408 configured to detect sounds, such as voice commands from a user. Outward-facing image sensors 1406 may include one or more depth sensors and/or one or more two-dimensional image sensors. In alternative arrangements, as noted above, a mixed reality or virtual reality display system, instead of incorporating a see-through display subsystem, may display mixed reality or virtual reality images through a viewfinder mode for an outward-facing image sensor.

The display system 1400 may further include a gaze detection subsystem 1410 configured for detecting a direction of gaze of each eye of a user or a direction or location of focus, as described above. Gaze detection subsystem 1410 may be configured to determine gaze directions of each of a user's eyes in any suitable manner. For example, in the illustrative example shown, a gaze detection subsystem 1410 includes one or more glint sources 1412, such as infrared light sources, that are configured to cause a glint of light to reflect from each eyeball of a user, and one or more image sensors 1414, such as inward-facing sensors, that are configured to capture an image of each eyeball of the user. Changes in the glints from the user's eyeballs and/or a location of a user's pupil, as determined from image data gathered using the image sensor(s) 1414, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 1410 may have any suitable number and arrangement of light sources and image sensors. In some implementations, the gaze detection subsystem 1410 may be omitted.

The display system 1400 may also include additional sensors. For example, display system 1400 may comprise a global positioning system (GPS) subsystem 1416 to allow a location of the display system 1400 to be determined. This may help to identify real world objects, such as buildings, etc. that may be located in the user's adjoining physical environment.

The display system 1400 may further include one or more motion sensors 1418 (e.g., inertial, multi-axis gyroscopic, or acceleration sensors) to detect movement and position/orientation/pose of a user's head when the user is wearing the system as part of a mixed reality or virtual reality HMD device. Motion data may be used, potentially along with eye-tracking glint data and outward-facing image data, for gaze detection, as well as for image stabilization to help correct for blur in images from the outward-facing image sensor(s) 1406. The use of motion data may allow changes in gaze location to be tracked even if image data from outward-facing image sensor(s) 1406 cannot be resolved.

In addition, motion sensors 1418, as well as microphone(s) 1408 and gaze detection subsystem 1410, also may be employed as user input devices, such that a user may interact with the display system 1400 via gestures of the eye, neck and/or head, as well as via verbal commands in some cases. It may be understood that sensors illustrated in FIGS. 14 and 15 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 1400 can further include a controller 1420 having a logic subsystem 1422 and a data storage subsystem 1424 in communication with the sensors, gaze detection subsystem 1410, display subsystem 1404, and/or other components through a communications subsystem 1426. The communications subsystem 1426 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 1424 may include instructions stored thereon that are executable by logic subsystem 1422, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 1400 is configured with one or more audio transducers 1428 (e.g., speakers, earphones, etc.) so that audio can be utilized as part of a mixed reality or virtual reality experience. A power management subsystem 1430 may include one or more batteries 1432 and/or protection circuit modules (PCMs) and an associated charger interface 1434 and/or remote power interface for supplying power to components in the display system 1400.

It may be appreciated that the display system 1400 is described for the purpose of example, and thus is not meant to be limiting. It is to be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

Figure 16:
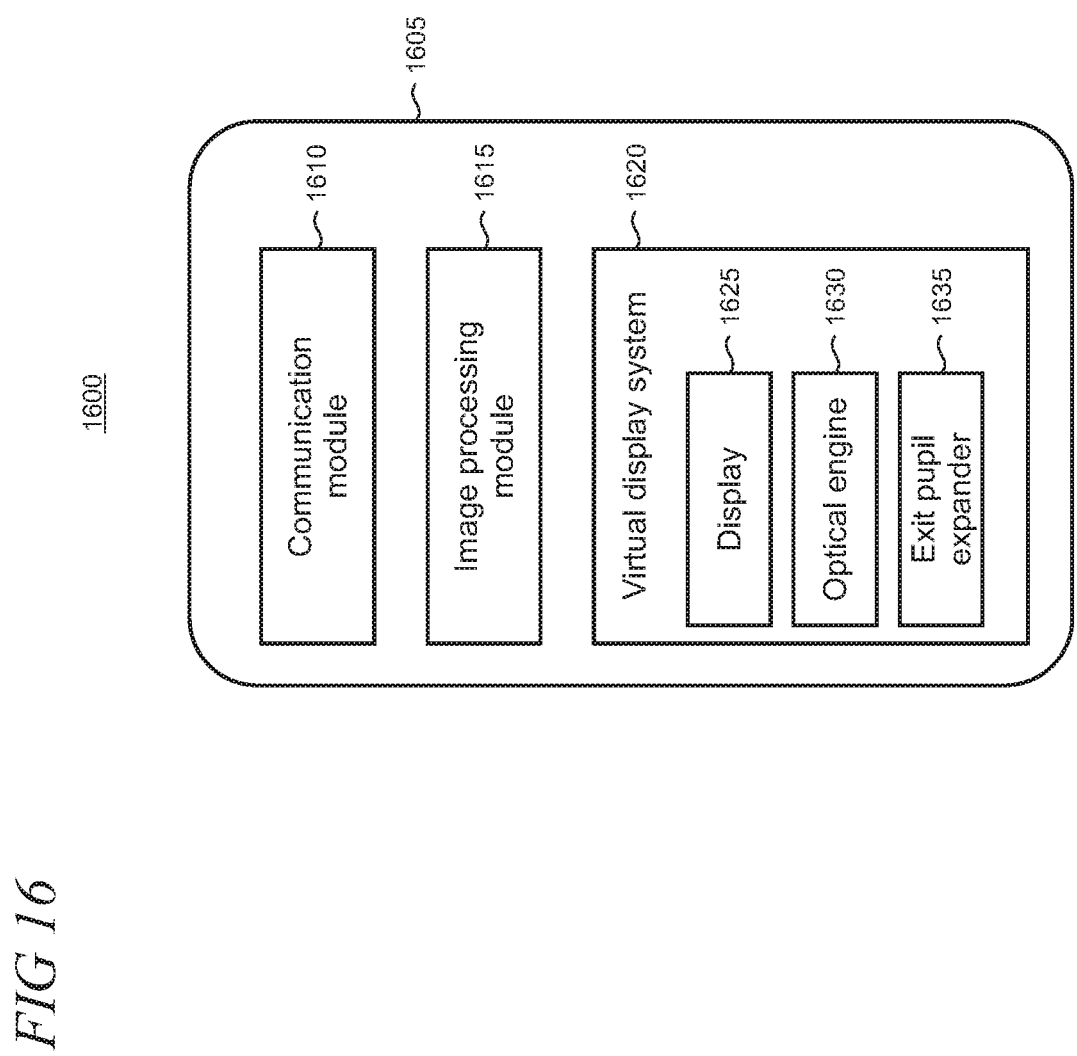
FIG. 16 shows a block diagram of an illustrative electronic device that incorporates an exit pupil expander.

As shown in FIG. 16, an EPE incorporating DOEs with asymmetric profiles can be used in a mobile or portable electronic device 1600, such as a mobile phone, smartphone, personal digital assistant (PDA), communicator, portable Internet appliance, hand-held computer, digital video or still camera, wearable computer, computer game device, specialized bring-to-the-eye product for viewing, or other portable electronic device. As shown, the portable device 1600 includes a housing 1605 to house a communication module 1610 for receiving and transmitting information from and to an external device, or a remote system or service (not shown).

The portable device 1600 may also include an image processing module 1615 for handling the received and transmitted information, and a virtual display system 1620 to support viewing of images. The virtual display system 1620 can include a micro-display or an imager 1625 and an optical engine 1630. The image processing module 1615 may be operatively connected to the optical engine 1630 to provide image data, such as video data, to the imager 1625 to display an image thereon. An EPE 1635 using one or more DOEs with asymmetric profiles can be optically linked to an optical engine 1630.

An EPE using one or more DOEs with asymmetric profiles may also be utilized in non-portable devices, such as gaming devices, multimedia consoles, personal computers, vending machines, smart appliances, Internet-connected devices, and home appliances, such as an oven, microwave oven and other appliances, and other non-portable devices.

Various exemplary embodiments of the present diffractive optical elements with asymmetric profiles are now presented by way of illustration and not as an exhaustive list of all embodiments. An example includes an optical system, comprising: a substrate of optical material; a first diffractive optical element (DOE) disposed on the substrate, the first DOE having an input surface and configured as an in-coupling grating to receive one or more optical beams as an input; and a second DOE disposed on the substrate and configured for pupil expansion of the one or more optical beams along a first direction, wherein at least a portion of the second DOE includes gratings that are configured with a predetermined slant angle to a direction orthogonal to a plane of the substrate.

In another example, the optical system further includes a third DOE disposed on the substrate, the third DOE having an output surface and configured for pupil expansion of the one or more optical beams along a second direction, and further configured as an out-coupling grating to couple, as an output from the output surface, one or more optical beams with expanded pupil relative to the input. In another example, at least a portion of the third DOE includes gratings that are configured with a second predetermined slant angle to a direction orthogonal to a plane of the output surface. In another example, at least a portion of the first DOE includes gratings that are configured with a third predetermined slant angle to a direction orthogonal to a plane of the input surface. In another example, the one or more optical beams received at the first DOE emanate as a virtual image produced by a micro-display or imager.

A further example includes an electronic device, comprising: a data processing unit; an optical engine operatively connected to the data processing unit for receiving image data from the data processing unit; an imager operatively connected to the optical engine to form images based on the image data and to generate one or more input optical beams incorporating the images; and an exit pupil expander, responsive to the one or more input optical beams, comprising a structure on which multiple diffractive optical elements (DOEs) are disposed, in which the exit pupil expander is configured to provide one or more output optical beams, using one or more of the DOEs, as a near eye virtual display with an expanded exit pupil, and wherein at least one of the DOEs is configured with gratings having an asymmetric profile.

In another example, the asymmetric profile comprises one of gratings with slanted sidewalls or blazed gratings. In another example, the exit pupil expander provides pupil expansion in two directions. In another example, the imager includes one of light emitting diode, liquid crystal on silicon device, organic light emitting diode array, or micro-electro mechanical system device. In another example, the imager comprises a micro-display operating in one of transmission, reflection, or emission. In another example, the electronic device is implemented in a head mounted display device or portable electronic device. In another example, each of the one or more input optical beams is produced by a corresponding one or more sources. In another example, the structure is curved or partially spherical. In another example, two or more of the DOEs are non-co-planar.

A further example includes a method, comprising: receiving light at an in-coupling diffractive optical element (DOE) disposed in an exit pupil expander; expanding an exit pupil of the received light along a first coordinate axis in an intermediate DOE disposed in the exit pupil expander; expanding the exit pupil along a second coordinate axis in an out-coupling DOE disposed in the exit pupil expander; and outputting light with an expanded exit pupil relative to the received light at the in-coupling DOE along the first and second coordinate axes using the out-coupling DOE, in which the intermediate DOE is configured with gratings that have non-orthogonal orientation relative to a plane of the exit pupil expander.

In another example, the non-orthogonal orientation comprises a slant angle of between 30 and 50 degrees from a normal to the plane. In another example, the in-coupling DOE, the intermediate DOE, or the out-coupling DOE is formed with a polymer that is molded from a substrate that is etched using ion beam etching in which the substrate is rotatable relative to an ion beam source. In another example, at least a portion of the out-coupling DOE is an apodized diffraction grating having shallow grooves relative to the in-coupling DOE or the intermediate DOE. In another example, the method is performed in a near eye display system. In another example, the output light provides a virtual display to a user of the near eye display system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of manufacturing an optical display system, comprising:
   providing a polymeric substrate of planar optical material;
   disposing a first diffractive optical element (DOE) arranged on the polymeric substrate, the first DOE having an input surface and configured as an in-coupling grating to receive one or more optical beams as an input;
   creating a glass mold having a planar microstructure comprising features that are asymmetric with respect to an axis that is orthogonal to the plane of the mold; and
   using the mold to form a second DOE on the polymeric substrate which is configured to receive one or more optical beams from the first DOE and couples the received one or more optical beams to a third DOE, and in which the second DOE is configured for pupil expansion of the received one or more optical beams along a first direction,
   wherein at least a portion of the second DOE includes grating features each having a slant angle to a respective axis orthogonal to the plane of the polymeric substrate, such that each grating feature is asymmetric about the axis, and
   wherein the second DOE is configured with uniform grating features that are periodic in only a single direction.

2. The method of claim 1 in which the third DOE is arranged on the polymeric substrate, the third DOE having an output surface and configured for pupil expansion of the one or more optical beams along a second direction, and further configured as an out-coupling grating to couple, as an output from the output surface, one or more optical beams with expanded pupil relative to the input.

3. The method of claim 2 in which at least a portion of the third DOE includes gratings that are configured with a second slant angle to a direction orthogonal to a plane of the output surface.

4. The method of claim 3 in which at least a portion of the first DOE includes gratings that are configured with a third slant angle to a direction orthogonal to a plane of the input surface.

5. The method of claim 1 in which one or more of the asymmetric grating features comprise one of gratings with slanted sidewalls or blazed gratings.

6. The method of claim 1 in which microstructure is formed from one of reactive ion beam etching (RIBE), magnetron reactive ion etching (MRIE), high density plasma etching (HDP), transformer coupled plasma etching (TCP), inductively coupled plasma etching (ICP), or electron cyclotron resonance plasma etching (ECR).

7. A method of producing a molded diffractive optical element (DOE) in a waveguide-based display system, comprising:
   providing an in-coupling DOE that is configured to in-couple input images from an imager into the waveguide-based display system;
   providing an out-coupling DOE that is configured to out-couple output images from the waveguide-based display system to an eye of a user;
   providing a substrate having at least one planar surface;
   exposing the substrate to a plasma source to etch a microstructure into the planar surface in which the microstructure comprises features that are asymmetric with respect to an axis that is orthogonal to the planar surface of the substrate;
   using the etched substrate to mold a planar DOE from a polymer material in which the molded DOE includes grating features each having a slant angle to a respective axis orthogonal to the plane of the DOE;
   assembling the molded DOE into the waveguide-based display system with the in-coupling DOE and the out-coupling DOE to create a light path that sequentially traverses the in-coupling DOE, the molded DOE, and the output DOE,
   wherein at least a portion of the molded DOE includes grating features each having a slant angle to a respective axis orthogonal to the plane of the molded DOE, and
   wherein the molded DOE is configured with uniform grating features that are periodic in only a single direction.

8. The method of claim 7 in which the molding comprises one of cast-and-cure, embossing, compression molding, or injection molding.

9. The method of claim 7 in which the molded DOE is configured to provide pupil expansion of the input images from the imager in a first direction.

10. The method of claim 9 in which the out-coupling DOE is configured to provide pupil expansion of the input images from the imager in a second direction.

11. The method of claim 9 in which the imager comprises a micro-display operating in one of transmission, reflection, or emission.

12. The method of claim 7 in which at least a portion of the out-coupling DOE comprises an apodized diffraction grating having shallow grooves relative to the in-coupling DOE or the molded DOE.

13. The method of claim 7 in which the display system is configured as a near eye display system.

14. A method for fabricating a diffractive optical element (DOE), comprising:
 providing a reactive ion etching source;
 affixing a substrate having at least one planar surface to a moveable holder;
 exposing the substrate to the reactive ion etching source to thereby etch grating features that are asymmetric with respect to an axis that is orthogonal to the planar surface;
 controlling the etching of the substrate to the reactive ion etching source by motion of the substrate relative to the reactive ion etching source;
 using the etched substrate to mold a planar DOE from a polymer material in which the molded DOE includes grating features each having a slant angle to a respective axis orthogonal to the plane of the DOE; and
 disposing the molded DOE on a waveguide that includes an in-coupling DOE configured as an in-coupling grating to receive one or more optical beams as an input,
 wherein the molded DOE receives the one or more optical beams from the in-coupling DOE, and
 wherein the molded DOE is configured for pupil expansion along a first direction, and
 wherein at least a portion of the molded DOE includes grating features each having a slant angle to a respective axis orthogonal to the plane of the molded DOE, and
 wherein the molded DOE is configured with uniform grating features that are periodic in only a single direction.

15. The method of claim 14 in which the controlling further comprises controlling a time of exposure of the substrate to the reactive ion etching source.

16. The method of claim 14 in which the motion comprises rotation.

17. The method of claim 14 in which the molded DOE is optically coupled to an out-coupling DOE disposed on the waveguide, in which the out-coupling DOE is configured for pupil expansion in a second direction and for out-coupling the one or more optical beams to an eye of a user.

18. The method of claim 17 in which the in-coupling DOE, molded DOE, and out-coupling DOE form an exit pupil expander providing pupil expansion in two directions.

19. The method of claim 17 in which the exit pupil expander is incorporated into a head mounted display (HMD) that includes an imager.

20. The method of claim 19 in which the imager includes one of light emitting diode, liquid crystal on silicon device, organic light emitting diode array, or micro-electromechanical system device.

* * * * *